(12) United States Patent
Achtner et al.

(10) Patent No.: US 11,273,899 B2
(45) Date of Patent: Mar. 15, 2022

(54) WING RIB, WING HAVING WING RIB, AND METHOD FOR MANUFACTURING THE SAME

(71) Applicant: The Boeing Company, Chicago, IL (US)

(72) Inventors: Gerfried R. Achtner, Mukilteo, WA (US); Young L. Zeon, Edmonds, WA (US)

(73) Assignee: The Boeing Company, Chicago, IL (US)

( * ) Notice: Subject to any disclaimer, the term of this patent is extended or adjusted under 35 U.S.C. 154(b) by 432 days.

(21) Appl. No.: 15/879,789

(22) Filed: Jan. 25, 2018

(65) Prior Publication Data
US 2019/0225319 A1 Jul. 25, 2019

(51) Int. Cl.
*B64C 3/18* (2006.01)
*B29C 53/24* (2006.01)
*B29C 70/30* (2006.01)
*B29L 31/30* (2006.01)
*B64C 3/26* (2006.01)

(52) U.S. Cl.
CPC ............. *B64C 3/187* (2013.01); *B29C 53/24* (2013.01); *B29C 70/30* (2013.01); *B29L 2031/3085* (2013.01); *B64C 3/26* (2013.01)

(58) Field of Classification Search
CPC ..................................................... B64C 3/187
See application file for complete search history.

(56) References Cited

U.S. PATENT DOCUMENTS

| 4,084,029 | A | 4/1978 | Johnson et al. |
| 4,734,146 | A | 3/1988 | Halcomb et al. |
| 5,919,543 | A | 7/1999 | McCarville et al. |
| 6,386,481 | B1 * | 5/2002 | Kallinen ............... B64C 3/18 |
| | | | 244/123.1 |
| 6,976,343 | B2 | 12/2005 | McGushion |

FOREIGN PATENT DOCUMENTS

| GB | 188055 A | * 10/1922 | ............ B64C 3/187 |
| JP | 11-99993 | 4/1999 | |
| JP | 2006-512240 | 4/2006 | |
| JP | 2009-190574 | 8/2009 | |
| JP | 2011-529006 | 12/2011 | |

OTHER PUBLICATIONS

European Patent Office, Communication, App. No. 18212607.8 (dated Apr. 16, 2019).
Dr. A.K. Green: "Composite Rib Development," Materials Engineering Dept., Engineering Division, Israel Aircraft Industries Ltd., 701001 Israel (May 19, 2004).

(Continued)

*Primary Examiner* — Jessica B Wong
(74) *Attorney, Agent, or Firm* — Walters & Wasylyna LLC

(57) ABSTRACT

A wing includes an upper wing skin, a lower wing skin, and a wing rib positioned between the upper wing skin and the lower wing skin. The wing rib includes: a corrugated composite web comprising a wave pattern and a first fitting coupling said corrugated composite web with one of said upper wing skin and said lower wing skin.

20 Claims, 8 Drawing Sheets

(56) References Cited

OTHER PUBLICATIONS

European Patent Office, "Communication pursuant to Article 94(3) EPC," App. No. 18 212 607.8 (dated Apr. 30, 2019).
http://okigihan.blogspot.com/p/wings-wing-configurations-wings-are.html.
http://eaavintage.org/february-2016-mystery/.
Japan Patent Office, Office Action, with English translation, App. No. 2019-005908 (dated Jun. 9, 2020).
European Patent Office, "Communication pursuant to Article 94(3) EPC," App. No. 18 212 607.8 (dated Dec. 10, 2020).
Japan Patent Office, Office Action, with English translation, App. No. 2019-005908 (dated Nov. 24, 2020).
European Patent Office, "Communication pursuant to Article 94(3) EPC," App. No. 18 212 607.8 (dated Jul. 30, 2021).

* cited by examiner

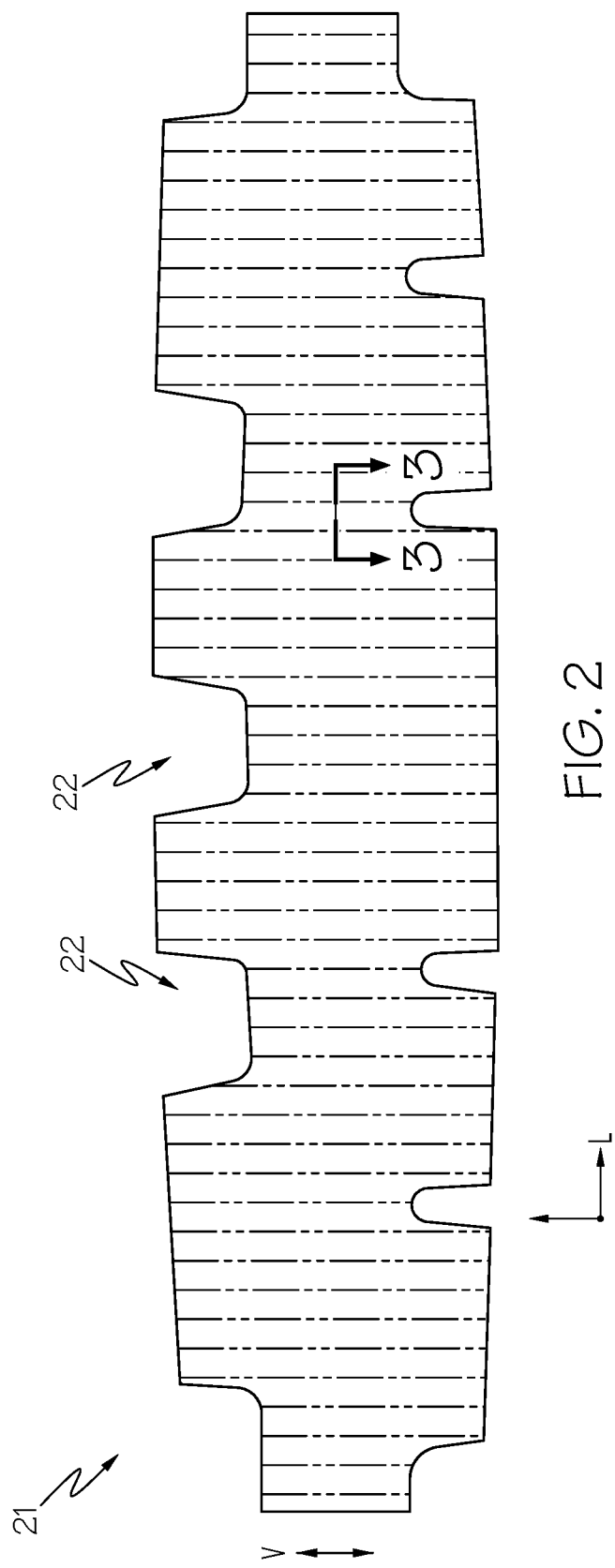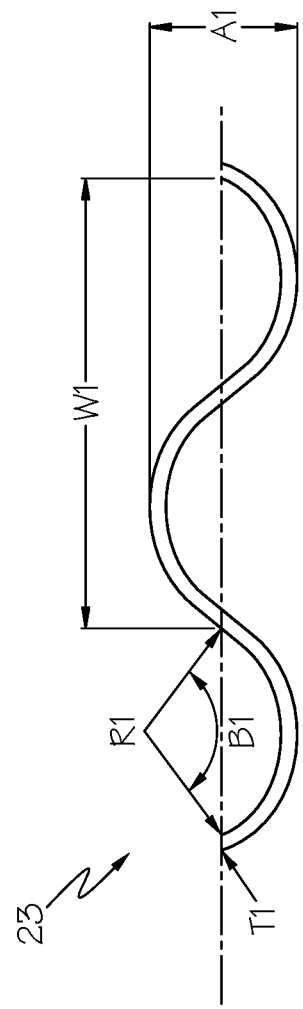

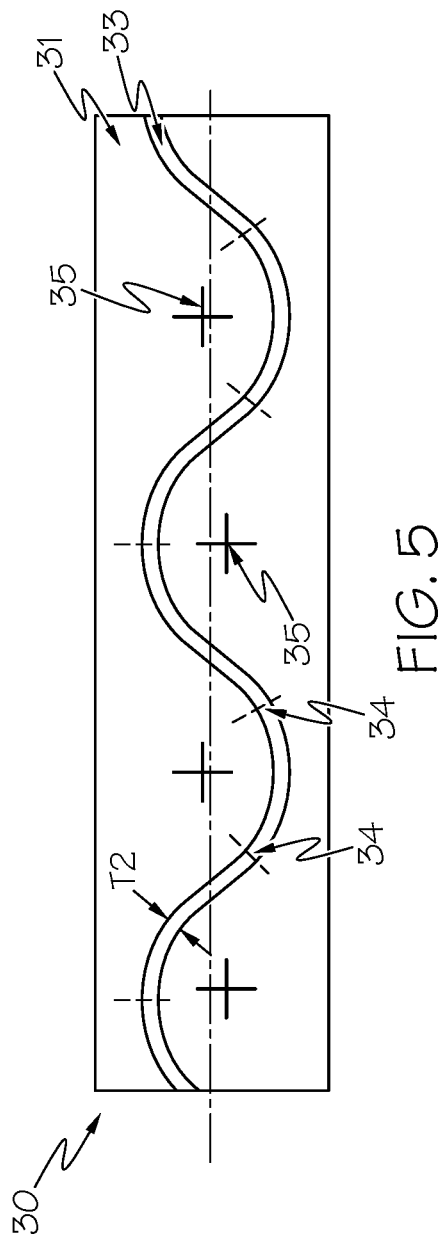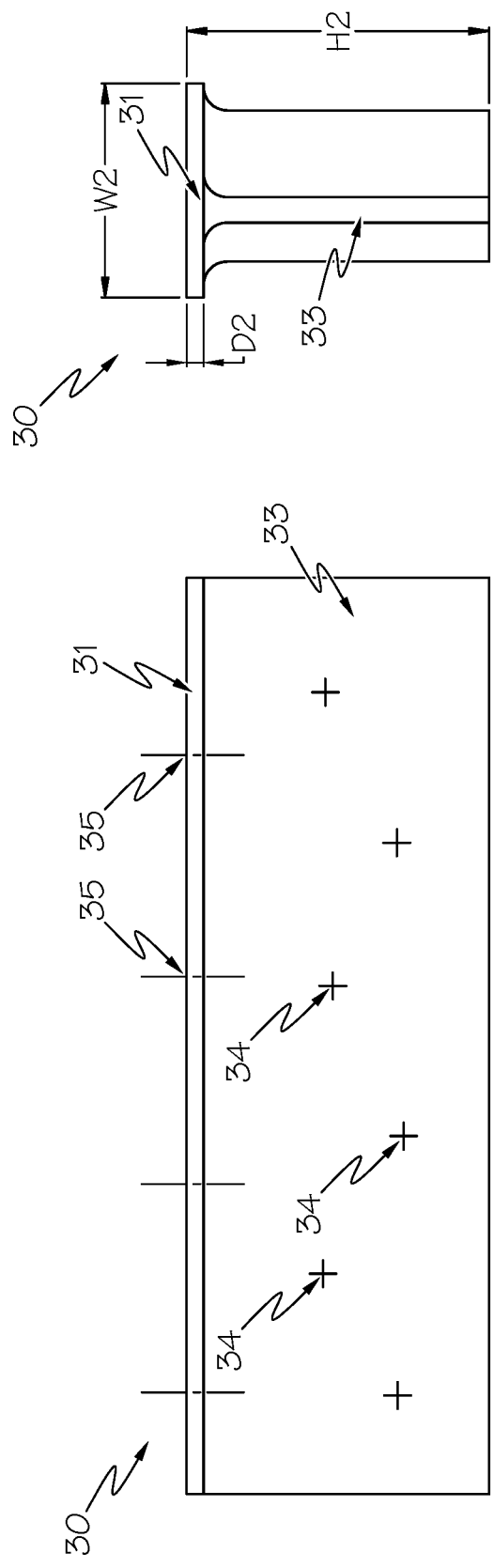
FIG. 5
FIG. 6
FIG. 7

WING RIB, WING HAVING WING RIB, AND METHOD FOR MANUFACTURING THE SAME

FIELD

The present application relates to the field of wing ribs, wings having wing ribs, and methods for manufacturing wing ribs.

BACKGROUND

Wing ribs are structural crosspieces that are included in the framework of a wing of an aircraft. Wing ribs extend between a leading edge of the wing and a trailing edge of the wing, holding the relative positions of the upper wing skin and lower wing skin, and transmitting loads to one or more wing spars. Wing ribs are usually manufactured from a lightweight metal such as aluminum. However, there is a desire for lighter and stronger materials in the construction of wing ribs.

Wing ribs have been manufactured from lightweight composite materials. However, existing wing ribs manufactured from composite materials have been cost prohibitive.

Accordingly, those skilled in the art continue with research and development in the field of wing ribs, wings having wing ribs, and methods for manufacturing wing ribs.

SUMMARY

In one embodiment, a wing includes an upper wing skin, a lower wing skin, and a wing rib positioned between the upper wing skin and the lower wing skin. The wing rib includes: a corrugated composite web comprising a wave pattern and a first fitting coupling said corrugated composite web with one of said upper wing skin and said lower wing skin.

In another embodiment, a method for manufacturing wing ribs includes: shaping at least one sheet of composite material into at least one corrugated sheet of composite material; cutting a first corrugated composite web and a second corrugated composite web from said at least one corrugated sheet of composite material, said first corrugated composite web having different dimensions than said second corrugated composite web; coupling said first corrugated composite web with an upper wing skin and a lower wing skin at a first position within a wing; and coupling said second corrugated composite web with said upper wing skin and said lower wing skin at a second position within said wing.

Other embodiments of the disclosed wing rib, wing having a wing rib, and method for manufacturing wing ribs will become apparent from the following detailed description, the accompanying drawings and the appended claims.

BRIEF DESCRIPTION OF THE DRAWINGS

FIG. 2 is a plan view of an exemplary corrugated composite web according to an embodiment of the present description;

FIG. 3 is a partial sectional side view of the corrugated composite web along line 3-3 of FIG. 2;

FIG. 5 is a bottom view of a fitting according to an embodiment of the present description;

FIG. 6 is a side view of the fitting of FIG. 5;

FIG. 7 is a front view of the fitting of FIG. 5;

DETAILED DESCRIPTION

Wing ribs and wings having wing ribs of the present description may take the form of any desired shape and size to provide for desired flight characteristics. Although the wings and the wing ribs of the present description are described in detail with reference to the illustrated embodiment, it should be understood that the wing and wing rib of the present description are not limited to the shape and size as illustrated.

Figure 1:
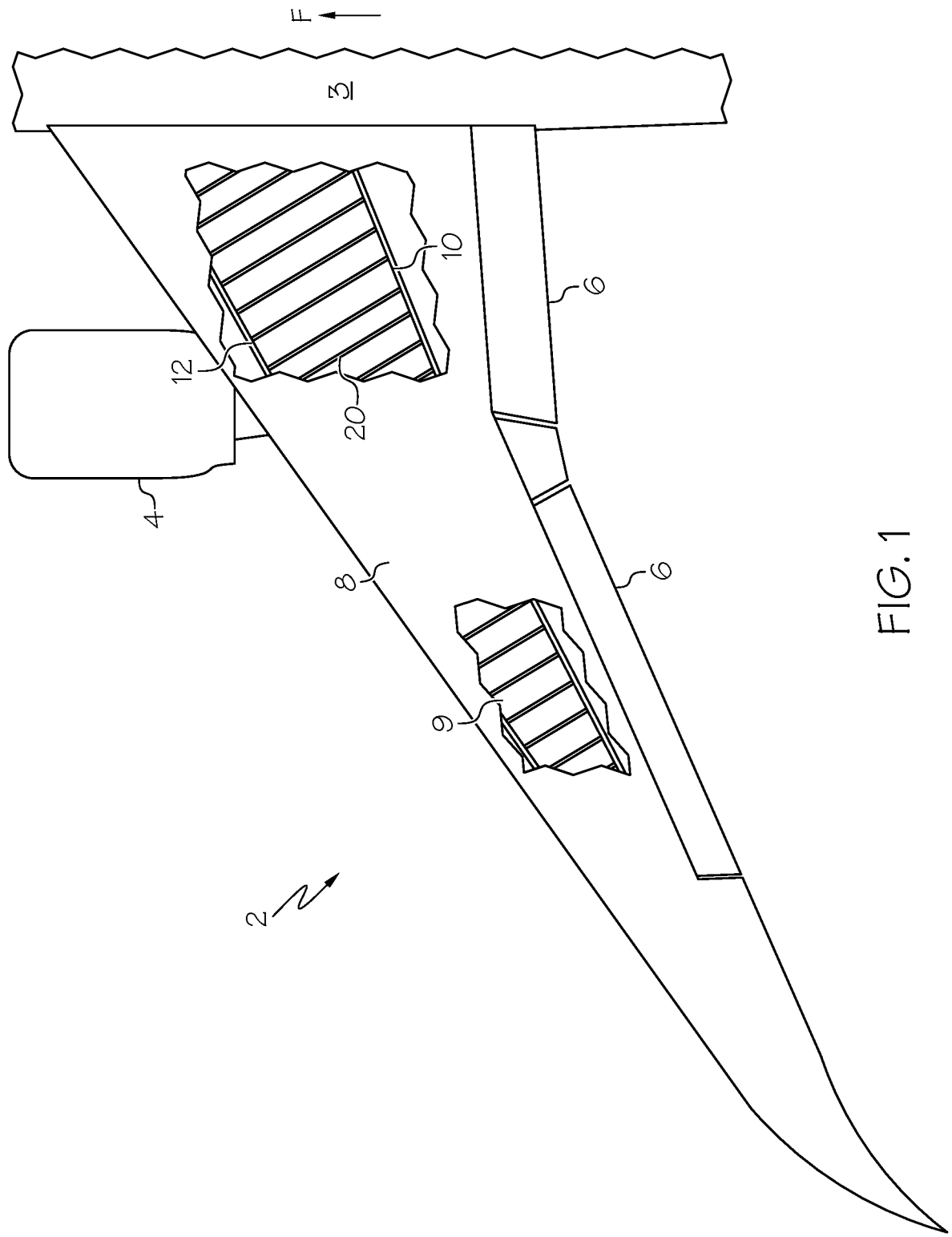
FIG. 1 is a partial plan view of an aircraft having a wing according to an embodiment of the present description, in which an upper wing skin is partially cutaway to reveal a rear spar, a forward spar, and a plurality of wing ribs.

FIG. 1 illustrates a portion of an exemplary aircraft having a wing 2, a fuselage 3, and an engine 4. The wing 2 includes one or more flaps 6, an upper wing skin 8, a lower wing skin 9, a rear spar 10, a forward spar 12, and a plurality of wing ribs 20 positioned between the upper wing skin 8, the lower wing skin 9, the rear spar 10, and the forward spar 12. The rear spar 10 and forward spar 12 run spanwise between the root of the wing coupled to the fuselage and the opposing tip of the wing, and the wing ribs 20 run chordwise between the leading edge of the wing and the trailing edge of the wing. The wing ribs 20 are coupled to the upper wing skin 8, the lower wing skin 9, the rear 10, and the forward spar 12 to transfer loads therebetween.

As a shape of the wing 2 changes according to a distance from the fuselage 3, the wings ribs 20 thereby have different sizes and shapes. This presents a challenge for cost-effective manufacturing of wing ribs 20.

In an embodiment of the present description, the wing ribs of the present description include a corrugated composite web having a wave pattern and a fitting coupling the corrugated composite web with the upper wing skin or the lower wing skin. The corrugated composite web acts to provide for compression and tensile strength in a vertical direction of the wing rib, and the wave pattern of the corrugated composite web acts to resist compressive stress of the corrugated composite web when a vertical compression force is applied thereto. Thus, the corrugated composite web does not require additional rib chords for internal load distribution, thereby simplifying manufacturing.

In an aspect, the corrugated composite web may be formed of a composite material having a plurality of fibers within a matrix material, more preferably the composite material comprises a plurality of carbon fibers within a polymer matrix material, such as a thermoplastic polymer matrix material or a thermoset polymer matrix material. By producing the wing rib from a composite material, a weight of the wing rib may be dramatically reduced.

In an aspect, the corrugated composite web may include one or more edge cutouts or interior penetrations. The edge cutouts and interior penetrations may be included to adapt the corrugated composite web to the design of the wing and to permit for passage of stringers and other wing system components through the span of the wing. The corrugated composite web can be used without local reinforcements at edge cutouts and interior penetrations.

In an aspect, the corrugated composite web may include at least a portion thereof having a uniform web gauge, preferably the corrugated composite web has a uniform web gauge along at least one full wave pattern of said corrugated composite web, more preferably the corrugated composite web has a uniform thickness throughout the corrugated composite web. In another aspect, the corrugations may be continuous throughout the corrugated composite web. This allows for cost-efficient manufacturing of the corrugated composite web by provide large sheets of corrugated composite web material from which several corrugated composite webs of different sizes can be cut and assembled to form a wing rib. Thus, no individual rib tooling is required, and one layup corrugation tool can be used for multiple adjoining rib stations of wing, thus simplifying manufacturing.

In an aspect, the corrugated composite web may include a plurality of layers of composite layup structures, in which one layer has fibers primarily aligned in a vertical direction of the wing rib, preferably parallel to the vertical direction of the wing rib to provide for maximum tensile and compression strength. The corrugated composite web may further include another layer of composite layup structure having fibers aligned at angle to the vertical direction to provide for resistance to shear.

In an aspect, the corrugations of the corrugated composite web may be primarily aligned with the vertical direction V of the wing rib, more preferably parallel to the vertical direction V of the wing rib to provide for maximum resistance to compressive stresses.

In an aspect, the wave pattern of the corrugated composite web may include a curved wave pattern, a trapezoidal wave pattern, and combinations thereof. The curved wave pattern may include, for example, a sinusoidal wave pattern, a circular wave pattern, or combinations thereof. The trapezoidal wave pattern may include, for example, a rectangular wave pattern.

In an aspect, the wave pattern may have a full wave width of at least 0.1 inches, preferably at least 0.5 inches, more preferably at least 1.0 inches. The full wave width of the wave pattern may be adapted based on the shape and size of the wing.

In an aspect, the fitting may be comprised of a lightweight metal, such as aluminum. The metal fitting may be formed by, for example, machining, 3D printing, or combinations thereof. In another aspect, the fitting may be comprised of a thermoplastic material formed to the desired shape.

In an embodiment of the present description, a wing includes an upper wing skin, a lower wing skin, and at least one wing rib between said upper wing skin and said lower wing skin. The wing rib includes a corrugated composite web comprising a wave pattern and a first fitting. The first fitting couples the corrugated composite web with the upper wing skin or the lower wing skin.

In an aspect, the wing rib may include a second fitting, in which the second fitting couples the corrugated composite web with the other of the upper wing skin and the lower wing skin.

In an aspect, a shim may be positioned between said first fitting and said one of said upper wing skin and said lower wing skin.

In an aspect, the wing may further include at least one wing spar and a second fitting coupling the corrugated composite web with a wing spar.

Figure 4:
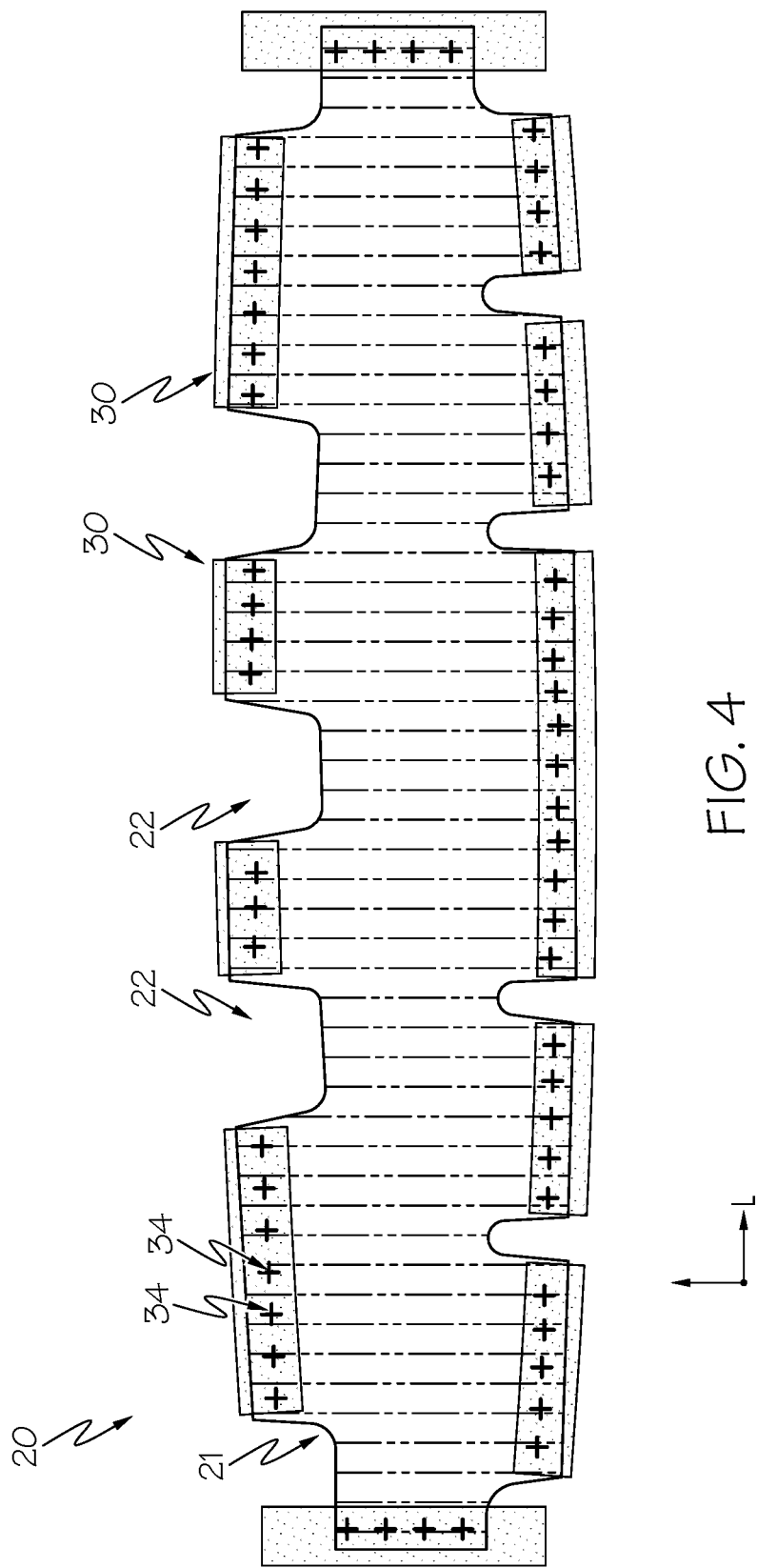
FIG. 4 is a wing rib according to an embodiment of the present description, including the corrugated composite web of FIGS. 2 and 3.

FIGS. 2 to 4 illustrate an exemplary wing rib of the present description including a corrugated composite web and a plurality of fittings. In particular, FIGS. 2 and 3 illustrate a corrugated composite web 21 of the wing rib, the corrugated composite web 21 including a wave pattern 23. As shown, the corrugated composite web 21 may include edge cutouts 22 to adapt the corrugated composite web to the design of the wing and to permit for passage of stringers or other wing system components through the span of the wing.

As shown in FIG. 2, corrugations of the corrugated composite web 21 are primarily aligned with the vertical direction V of the wing rib, in particularly, the corrugations are parallel to the vertical direction V of the wing rib to provide for maximum resistance to compressive stresses.

As shown in FIG. 3, the corrugated composite web 21 may have a portion thereof having a uniform thickness T1, particularly showing the corrugated composite web having a uniform thickness along at least one full wave pattern W1 of said corrugated composite web. Preferably the corrugated composite web 21 has a uniform thickness T1 throughout the corrugated composite web to permit for efficient manufacture. However, it will be understood that the corrugated composite web 21 may be readily reinforced at portions thereof, such as providing one or more layers of composite layup structures thereon, without departing from the scope of the present description.

As further shown in FIG. 3, the wave pattern of the corrugated composite web includes a curved wave pattern having full wave width W1, peak to peak amplitude A1, and thickness T1. Particularly, the curved wave pattern represents a combination of a sinusoidal and circular wave pattern for ease of manufacture, in which a circular wave portion has radius R1 throughout angle B1. However, the wave pattern is not limited thereto and may include any wave pattern that acts to resist compressive stresses when a compression force is applied in a vertical direction V of the wing rib. For example, the wave pattern may include a curved wave pattern, such as a sinusoidal wave pattern, a circular wave pattern, or combinations thereof, a trapezoidal wave pattern, such as a rectangular wave pattern, or a combination of a curved wave pattern and a trapezoidal wave pattern.

FIG. 4 illustrates an exemplary wing rib 20 including the corrugated composite web 21 of FIGS. 2 and 3 with a plurality of fittings 30 engaged with the corrugated composite web. The fitting may be formed from a lightweight metal, such as aluminum, or a thermoplastic composite. The aluminum fitting may be formed by, for example, machining, 3D printing, or combinations thereof.

The plurality of fittings 30 includes fittings that engage with the wave pattern 23 of the corrugated composite web 21, such as the fitting shown to engage with the top and bottom of the corrugated composite web 21 as shown in FIG. 4. These fittings should be sized and shaped to correspond with the wave pattern of the corrugated composite web. An exemplary fitting is illustrated in FIGS. 5 to 7.

FIG. 6 shows fitting 30 having an engagement structure 33 that has a shape and size corresponding to the wave pattern 23 of the corrugated composite web 21. As shown in FIGS. 5 and 6, the fitting 30 may be engaged with the wave pattern 23 of the corrugated composite web 21 by, for example, fastening the engagement structure 33 to the wave pattern 23 at fastening positions 34. In an aspect, the fittings are formed, such as by machining or 3D printing, to have a corrugated engagement structure 33 that matches the wave pattern of the corrugated composite web. Alternatively, instead of fastening, thermoplastic fittings and webs could be bonded together by a consolidation process.

Each of the fittings 30 at the top and bottom of the corrugated composite web 21 may have a different structure in order to engage with the corresponding portions of the corrugated composite web. Furthermore, as shown in FIGS. 5 to 7, the fittings 30 further include a flange portion 31 for coupling to a respective portion of a wing skin, such as by fastening the flange portion 31 to the wing skin at fastening portions 35.

As shown, flange 31 is shown as having a flat upper surface. In the case of the flange 31 having a flat upper surface, a shim having a contour of a respective portions of the wing skin may be positioned between the flange 31 and the wing skin. Alternatively, the flange 31 may be manufactured to have an upper surface that corresponds with the contour of the respective portion of the wing skin.

Due to the different shapes and sizes of each wing rib and different contours of portions of the wing skin associated with each fitting, fittings manufactured for one wing rib may not be suitable for use with another wing rib. Therefore, customized fittings may be manufacturing by a suitable process, such as by CNC machining, 3D printing, or combinations thereof.

The plurality of fittings 30 further includes fittings, such as shown at the left and right of the corrugated composite web 21 in FIG. 4, that do not engage with the wave pattern 23 of the corrugated composite web 21. The structure of these fittings is not shown, and it will be understanding that design structural details of a fitting to engage with the corrugated composite web at these portions would be within the ordinary skill in the art.

Figure 8:
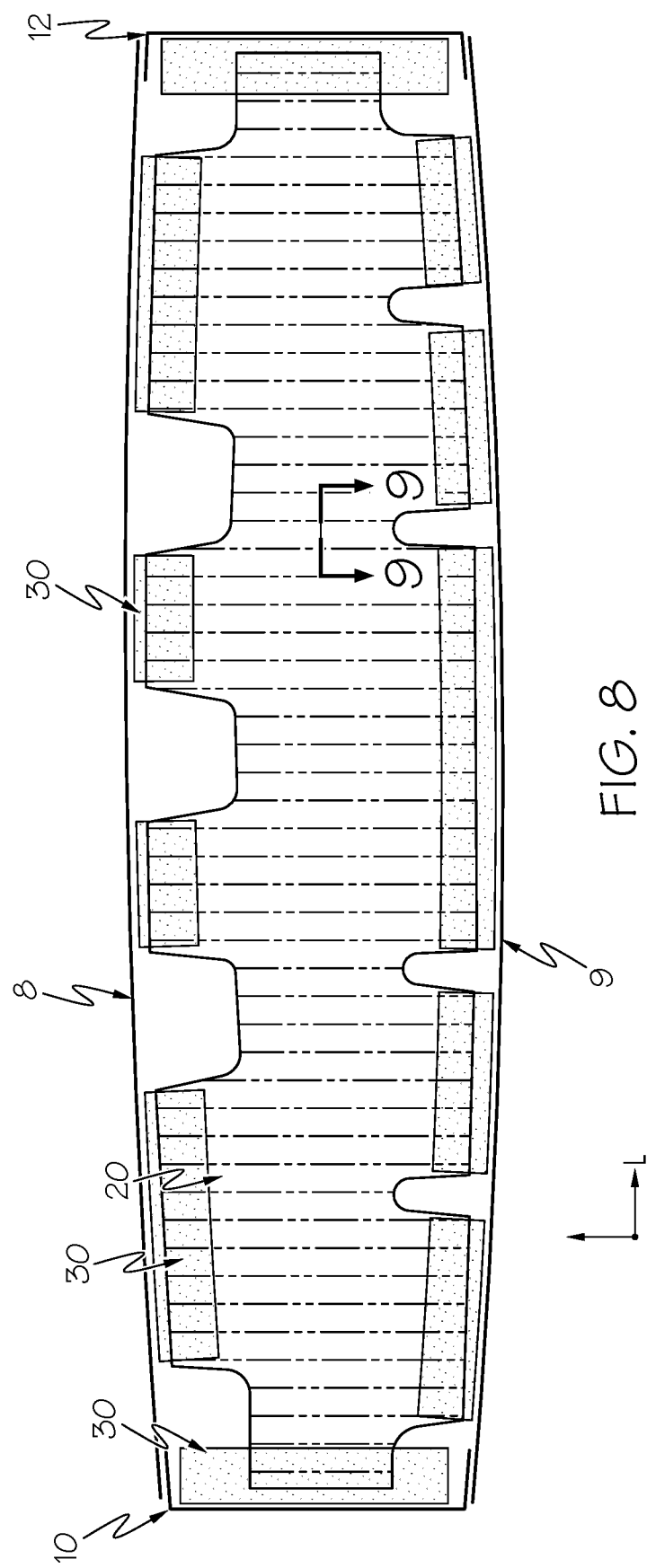
FIG. 8 illustrates a wing rib as coupled to an upper wing skin, a lower wing skin, a rear spar, and a forward spar according to an embodiment of the present description.

FIG. 8 illustrates the wing rib of FIGS. 2 to 7 as coupled to the upper wing skin 8, the lower wing skin 9, the rear spar 10, the forward spar 12.

Figure 9:
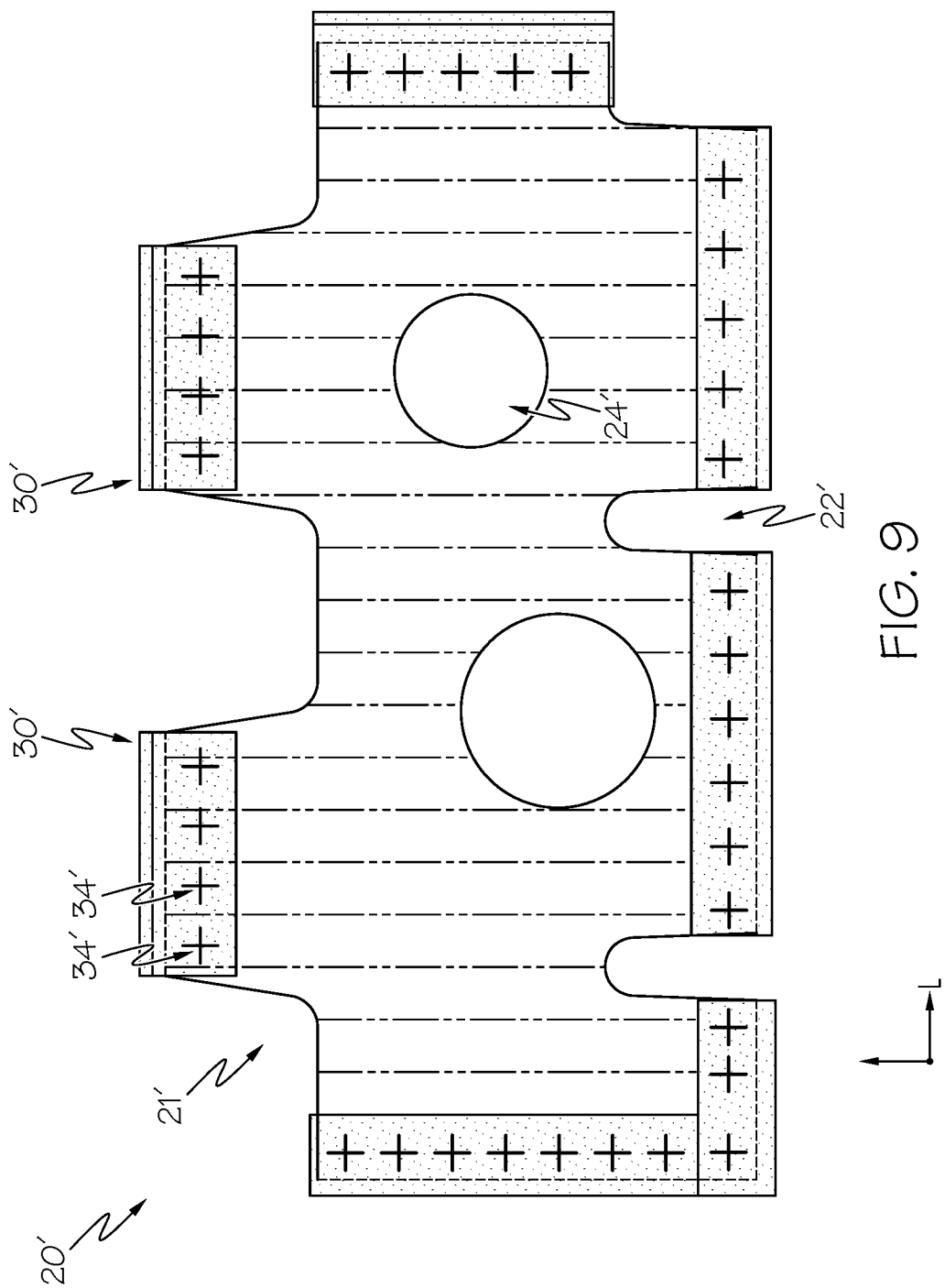
FIG. 9 is a plan view of another exemplary corrugated composite web according to an embodiment of the present description.

FIG. 9 illustrates another exemplary wing rib 20' including a corrugated composite web 21' with edge cutouts 22' and interior penetrations 24' and a plurality of fittings 30' being engaged with a wave pattern of the corrugated composite web 21' and being fastened thereto at 34'.

Figure 10:
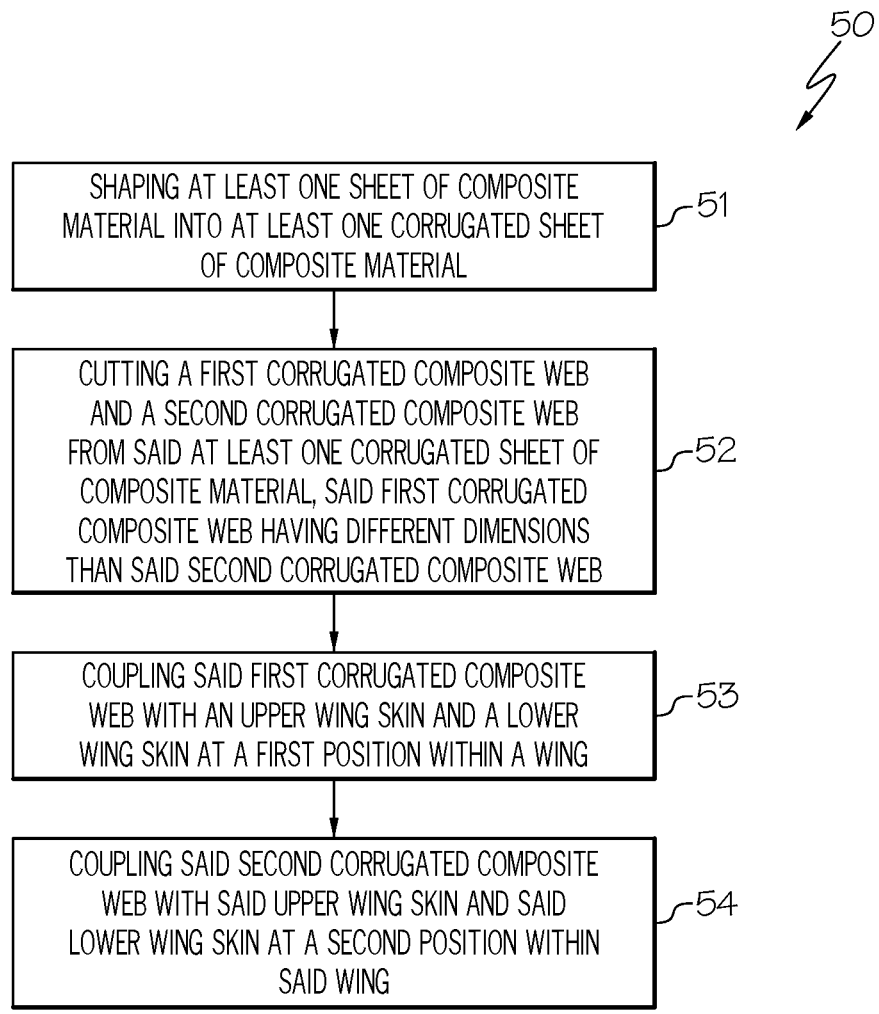
FIG. 10 is a flow diagram representing a method for manufacturing rib wings according an embodiment of the present description.

FIG. 10 represents a method 50 of manufacturing wing ribs, in which the method includes: at block 51, shaping at least one sheet of composite material into at least one corrugated sheet of composite material; at block 52, cutting a first corrugated composite web and a second corrugated composite web from said at least one corrugated sheet of composite material, said first corrugated composite web having different dimensions than said second corrugated composite web; at block 53, coupling said first corrugated composite web with an upper wing skin and a lower wing skin at a first position within a wing; and, at block 54, coupling said second corrugated composite web with said upper wing skin and said lower wing skin at a second position within said wing.

In an aspect, the first corrugated composite web and second corrugated composite web may include at least a portion thereof having a uniform web gauge, preferably the corrugated composite webs having a uniform web gauge along at least one full wave pattern of said corrugated composite web, more preferably the corrugated composite web has a uniform thickness throughout the corrugated composite web. In another aspect, the corrugations may be continuous throughout the corrugated composite webs. This allows for efficient manufacturing of the corrugated composite web by provide large sheets of corrugated composite web material from which several corrugated composite webs of different sizes can be cut and assembled to form a wing rib. Thus, no individual rib tooling is required, and one layup corrugation tool can be used for manufacturing multiple corrugated composite web having different dimensions to be positioned in multiple adjoining rib stations of a wing.

In an aspect, the first corrugated composite web and the second corrugated may be cut from a single sheet of composite material. In another aspect, the first corrugated composite web and the second corrugated may be cut from separate sheets of composite material, in which the separate sheets of composite material are formed by the same layup corrugation tool.

Figure 11:
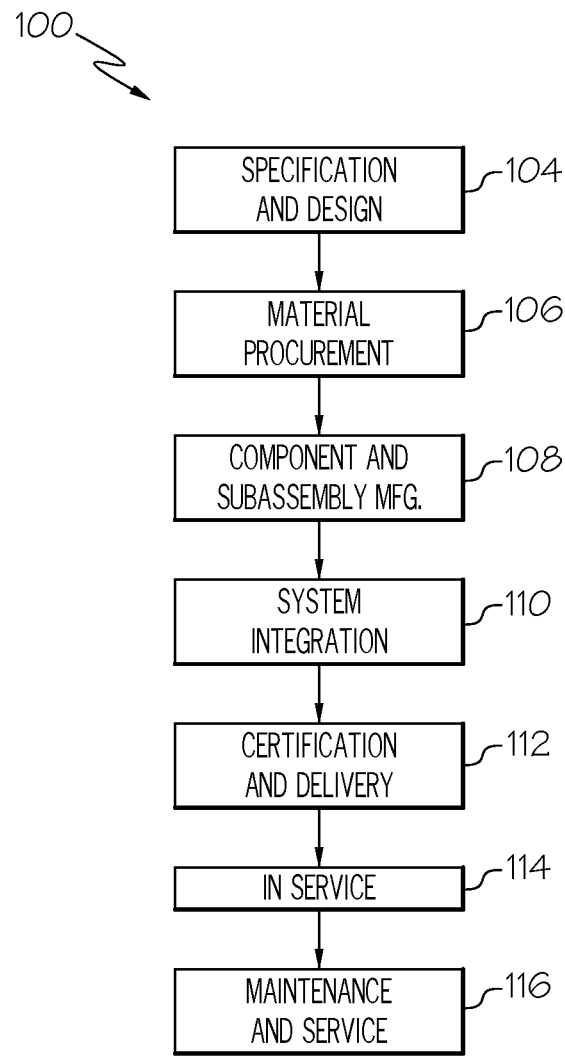
FIG. 11 is flow diagram of an aircraft manufacturing and service methodology.
Figure 12:
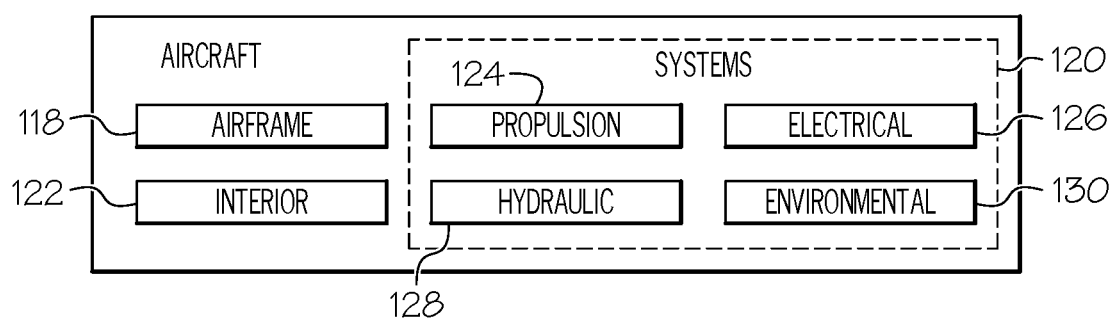
FIG. 12 is a block diagram of an aircraft.

Examples of the present disclosure may be described in the context of an aircraft manufacturing and service method 100, as shown in FIG. 11, and an aircraft 102, as shown in FIG. 12. During pre-production, the aircraft manufacturing and service method 100 may include specification and design 104 of the aircraft 102 and material procurement 106. During production, component/subassembly manufacturing 108 and system integration 110 of the aircraft 102 takes place. Thereafter, the aircraft 102 may go through certification and delivery 112 in order to be placed in service 114. While in service by a customer, the aircraft 102 is scheduled for routine maintenance and service 116, which may also include modification, reconfiguration, refurbishment and the like.

Each of the processes of method 100 may be performed or carried out by a system integrator, a third party, and/or an operator (e.g., a customer). For the purposes of this description, a system integrator may include without limitation any number of aircraft manufacturers and major-system subcontractors; a third party may include without limitation any number of venders, subcontractors, and suppliers; and an operator may be an airline, leasing company, military entity, service organization, and so on.

The wing rib, wing having a wing rib and method for manufacturing may be employed during any one or more of the stages of the aircraft manufacturing and service method 100, including specification and design 104 of the aircraft 102, material procurement 106, component/subassembly manufacturing 108, system integration 110, certification and delivery 112, placing the aircraft in service 114, and routine maintenance and service 116.

As shown in FIG. 12, the aircraft 102 produced by example method 100 may include an airframe 118 with a plurality of systems 120 and an interior 122. Examples of the plurality of systems 120 may include one or more of a propulsion system 124, an electrical system 126, a hydraulic system 128, and an environmental system 130. Any number of other systems may be included. The disclosed expendable devices and method may be employed for any of the systems of the aircraft 102, including the airframe 118 and the interior 122.

Although various embodiments of the disclosed wing rib, wing having a wing rib, and method for manufacturing wing ribs have been shown and described, modifications may occur to those skilled in the art upon reading the specification. The present application includes such modifications and is limited only by the scope of the claims.

What is claimed is:

1. A wing, comprising:
an upper wing skin;
a lower wing skin; and a wing rib positioned between said upper wing skin and said lower wing skin, said wing rib comprising:
  a corrugated composite web comprising a length direction, a width direction, and a height direction, wherein the length and height of the corrugated composite web is greater than the width of the corrugated composite web, the corrugated composite web comprising a wave pattern; and
  a first one-piece fitting comprising a length direction, a width direction, and a height direction, wherein the length of the first one-piece fitting is greater than the width and height of the one-piece fitting, wherein the length direction of the first one-piece fitting is aligned to be perpendicular to the width of the corrugated composite web, wherein the first one-piece fitting is coupled to said corrugated composite web and is coupled to one of said upper wing skin and said lower wing skin, wherein said first one-piece fitting has an engagement structure comprising a wave pattern that corresponds to the wave pattern of said corrugated composite web, and wherein said first one-piece fitting has a flange portion for coupling with said upper wing skin or said lower wing skin.

2. The wing of claim 1 wherein said corrugated composite web comprises a plurality of fibers within a matrix material.

3. The wing of claim 1 wherein said corrugated composite web comprises one or more edge cutouts.

4. The wing of claim 1 wherein said corrugated composite web comprises one or more interior penetrations.

5. The wing of claim 1 wherein said corrugated composite web comprises a plurality of layers of composite layup structures, at least one layer having fibers aligned in a direction parallel to a corrugation and at least one layer having fibers aligned in a direction not parallel to said corrugation.

6. The wing of claim 1 wherein said wave pattern has a full wave width of at least 0.1 inches.

7. The wing of claim 1 wherein said first one-piece fitting comprises aluminum.

8. The wing of claim 1 further comprising a shim positioned between said first one-piece fitting and said one of said upper wing skin and said lower wing skin.

9. The wing of claim 1 further comprising:
  at least one wing spar; and
  a second one-piece fitting coupling said corrugated composite web with said at least one wing spar.

10. A method for manufacturing wing ribs, said method comprising:
  shaping at least one sheet of composite material into at least one corrugated sheet of composite material;
  cutting a first corrugated composite web and a second corrugated composite web from said at least one corrugated sheet of composite material, said first corrugated composite web comprising a wave pattern and comprising a length direction, a width direction, and a height direction, wherein the length and height of the first corrugated composite web is greater than the width of the first corrugated composite web, said first corrugated composite web having different dimensions than said second corrugated composite web;
  coupling said first corrugated composite web with an upper wing skin and a lower wing skin at a first position within a wing, wherein a first one-piece fitting couples to said first corrugated composite web and to one of said upper wing skin and said lower wing skin, wherein said first one-piece fitting has an engagement structure comprising a wave pattern that corresponds to the wave pattern of said first corrugated composite web, and wherein said first one-piece fitting has a flange portion for coupling with said upper wing skin or said lower wing skin, said first one-piece fitting comprising a length direction, a width direction, and a height direction, wherein the length of the first one-piece fitting is greater than the width and height of the one-piece fitting, wherein the length direction of the first one-piece fitting is aligned to be perpendicular to the width of the first corrugated composite web; and
  coupling said second corrugated composite web with said upper wing skin and said lower wing skin at a second position within said wing.

11. The method for claim 10 wherein said first corrugated composite web and said second corrugated composite web are cut from a single corrugated sheet of composite material.

12. The method for claim 10 wherein said shaping said at least one sheet of composite material into said at least one corrugated sheet of composite material includes shaping a plurality of sheets of composite material using the same corrugation tool.

13. The wing of claim 1 wherein the wave pattern of the corrugated composite web extends to an edge of the wing rib.

14. The wing of claim 1 wherein the first one-piece fitting is directly fixed to the wave pattern of the corrugated composite web.

15. The wing of claim 1 wherein said engagement structure of said first one-piece fitting is fastened to said wave pattern of said corrugated composite web.

16. The wing of claim 1 wherein said first one-piece fitting comprises:
  the flange portion having a first end and a second end and having an upper surface and a lower surface; and
  the engagement structure positioned downwardly from the lower surface of the flange portion and in the wave pattern between the first end and the second end.

17. The wing of claim 16 wherein the flange portion comprises a plurality of fastening portions between adjacent waves of the wave pattern of the engagement structure, wherein the plurality of fastening portions are configured for fastening to said upper wing skin or said lower wing skin.

18. The wing of claim 17 wherein the engagement structure comprises a plurality of fastening portions on the wave pattern of the engagement structure, wherein the plurality of fastening portions are configured for fastening to said wave pattern of said corrugated composite web.

19. The wing of claim 17 wherein a first fastening portion of said plurality of fastening portions is positioned on the wave pattern of the engagement structure at a first distance from the lower surface of the flange, and wherein a second fastening portion of said plurality of fastening portions is positioned on the wave pattern of the engagement structure at a second distance from the lower surface of the flange, wherein the first distance is less than the second distance.

20. The wing of claim 3 wherein said corrugated composite web comprises an edge cutout between first and second adjacent edges of the corrugated composite web, wherein the first one-piece fitting is coupled to the first or second adjacent edge of the corrugated composite web.

* * * * *